United States Patent
Khan et al.

(10) Patent No.: US 9,509,723 B1
(45) Date of Patent: Nov. 29, 2016

(54) SESSION INITIATION PROTOCOL (SIP) SERVER TO EFFICIENTLY HANDLE SESSION DESCRIPTION PROTOCOL (SDP) DATA SETS

(71) Applicant: Sprint Communications Company L.P., Overland Park, KS (US)

(72) Inventors: Ehtesham Khan, Santa Clara, CA (US); Abdolreza Asghari, Santa Clara, CA (US); Mark J. Bonn, Granite Bay, CA (US); James D. Kirby, San Mateo, CA (US); Dominick Mangiardi, Fremont, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 213 days.

(21) Appl. No.: 14/296,282

(22) Filed: Jun. 4, 2014

(51) Int. Cl.
G06F 15/16 (2006.01)
H04L 29/06 (2006.01)

(52) U.S. Cl.
CPC .................. H04L 65/1006 (2013.01)

(58) Field of Classification Search
USPC ........................................................ 709/227
See application file for complete search history.

(56) References Cited

U.S. PATENT DOCUMENTS

| | | | |
|---|---|---|---|
| 8,478,276 B1 | 7/2013 | Koren et al. | |
| 8,594,013 B2 | 11/2013 | Wu | |
| 8,767,945 B2* | 7/2014 | Simoes | H04M 3/5191 379/265.02 |
| 2008/0013545 A1* | 1/2008 | Ono | H04L 12/5695 370/395.21 |
| 2010/0241804 A1* | 9/2010 | Parthasarathy | G06F 12/0875 711/118 |
| 2012/0239688 A1* | 9/2012 | Yanase | G06F 17/30545 707/769 |
| 2015/0026243 A1* | 1/2015 | Forsberg | H04L 65/1016 709/203 |

* cited by examiner

Primary Examiner — Kristie Shingles
Assistant Examiner — Mohammad Yousuf A Mian (57) ABSTRACT

A Session Initiation Protocol (SIP) server comprises a signaling data system that receives a first SIP message having a Session Description Protocol (SDP) data set. The signaling system responsively stores the SDP data set in association with a session segment identifier and transfers a session request having the session segment identifier and not the SDP data set. The SIP server has a session data system that receives the session request having the session segment identifier and not the SDP data set. The session data system responsively authorizes the session request and transfers a session instruction having the session segment identifier. The signaling data system receives the session instruction having the session segment identifier and responsively identifies the SDP data set with the session segment identifier and transfers a second SIP message having the SDP data set.

20 Claims, 8 Drawing Sheets

SESSION INITIATION PROTOCOL (SIP) SERVER TO EFFICIENTLY HANDLE SESSION DESCRIPTION PROTOCOL (SDP) DATA SETS

TECHNICAL BACKGROUND

The Session Initiation Protocol (SIP) comprises a signaling format that is used to establish media sessions between user communication devices. In between the user devices, various network elements process SIP messages to broker and manage the communication sessions. The SIP messages contain data sets based on the Session Description Protocol (SDP). The SDP data sets indicate media session parameters, such as: protocol version number, originator and session identifier, network address, session name, session title, URIs, email addresses, contact names, phone numbers, connection information, bandwidth information, time zone adjustments, encryption keys, session attributes, time descriptions, session active times, repeat times, media descriptions, media names and transport addresses, media titles, and the like.

SIP servers are separated into processing layers. A line handler layer provides transport layer capability for SIP messages and their SDP data sets. The line handler layer exchanges the SIP/SDP messages with a SIP layer. The SIP layer provides SIP message parsing and SDP data storage. The SIP layer exchanges the SIP messages and their SDP data sets with a Voice Over Internet Protocol (VOIP) application layer. The VOIP application layer authorizes the binding of various call legs to form the media sessions.

The SDP data sets are exchanged back and forth between the SIP layers and the VOIP application layers of the SIP servers. This SDP data transfer consumes precious processing resources and slows down the servers. Unfortunately, the SIP servers handle SDP data sets in an inefficient and ineffective manner between the server layers.

TECHNICAL OVERVIEW

A Session Initiation Protocol (SIP) server comprises a signaling data system that receives a first SIP message having a Session Description Protocol (SDP) data set. The signaling system responsively stores the SDP data set in association with a session segment identifier and transfers a session request having the session segment identifier and not the SDP data set. The SIP server has a session data system that receives the session request having the session segment identifier and not the SDP data set. The session data system responsively authorizes the session request and transfers a session instruction having the session segment identifier. The signaling data system receives the session instruction having the session segment identifier and responsively identifies the SDP data set with the session segment identifier and transfers a second SIP message having the SDP data set.

DETAILED DESCRIPTION

Figure 1:
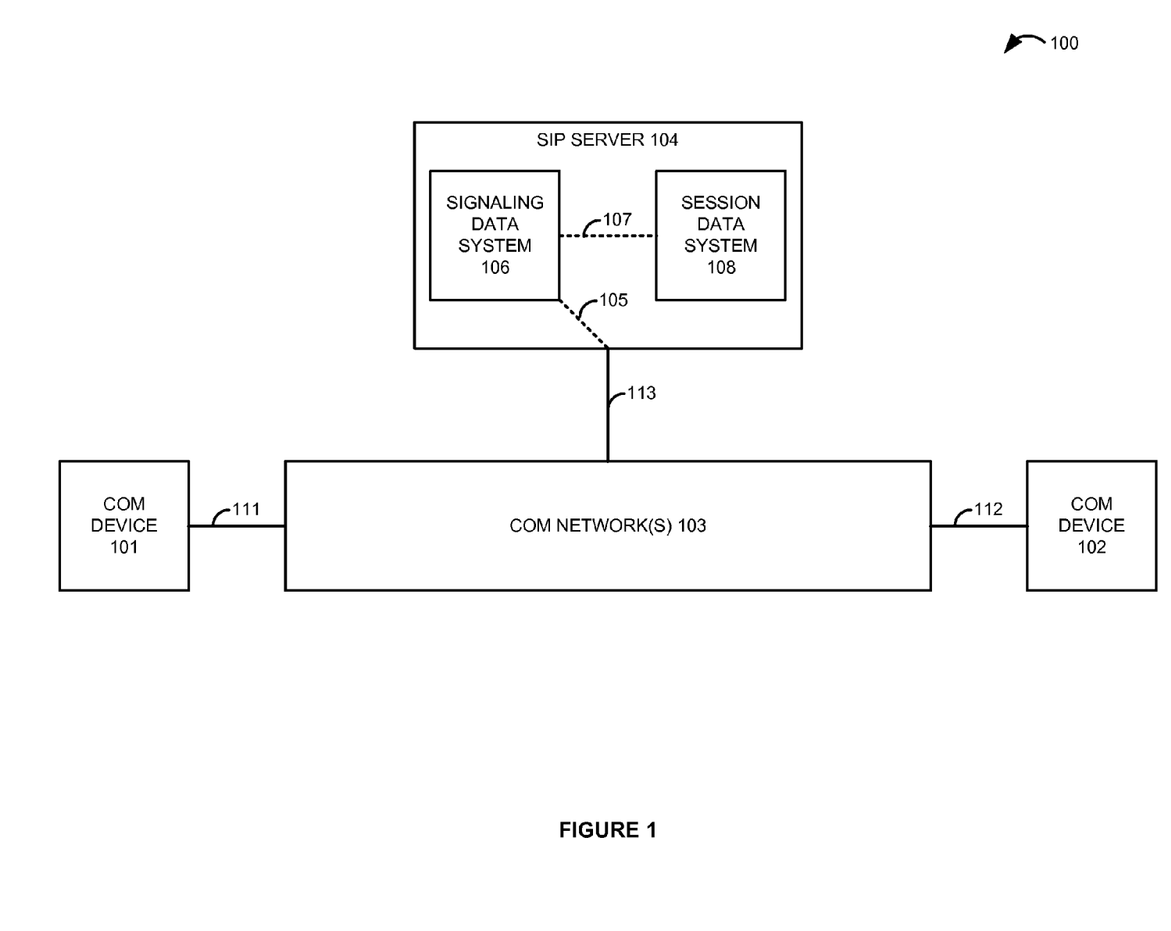
FIGS. 1-3 illustrate communication system 100 with SIP server 104 to handle SIP messages that include SDP data sets.

FIG. 1 illustrates communication system 100 with SIP server 104 to handle Session Initiation Protocol (SIP) messages that include Session Description Protocol (SDP) data sets. Communication system 100 comprises communication devices 101-102, communication network(s) 103, and SIP server 104. Communication devices 101-102 comprise phones, computers, media players, media servers, internet appliances, and/or some other apparatus having network communication components—including combinations thereof. SIP server 104 comprises an Internet Multimedia Subsystem (IMS) server, Telephony Application Server (TAS), media server and/or some other communication control platform—including combinations thereof.

SIP server 104 comprises network interface 105, signaling data system 106, processing interface 107, and session data system 108. Signaling data system 106 exchanges SIP messages with external systems over network interface 105. Signaling data system 106 and session data system 108 exchange versions of these SIP messages with over processing interface 107. In particular, signaling data system 106 and session data system 108 efficiently transfer SDP data (if any) over processing interface 107.

Communication devices 101-102 exchange SIP messages with SIP server 104 to establish media sessions over communication network(s) 103. The portion of a media session from communication device 101 into communication network(s) 103 is referred to as a call leg, address pair, session segment, or the like. For example, a media session between communication devices 101-102 might have two session segments: a reference segment from communication device 101 over link 111 into network(s) 103 and an additional segment from communication device 102 over link 112 into network(s) 103.

To control and support these media sessions, signaling data system 106 receives SIP messages having SDP data sets. Signaling data system 106 stores the SDP data sets in association with their respective session segment identifiers. Signaling data system 106 transfers session requests to session data system 108 over processing interface 107. The session requests have the session segment identifiers but do not contain not the SDP data sets. Session data system 108 receives and authorizes the session requests to return session instructions with the session segment identifiers to signaling data system 106. Signaling data system 106 receives the session instructions with session segment identifiers. In response, signaling data system 106 uses the session segment identifiers to identify the SDP data sets and transfers SIP messages that have the appropriate SDP data sets.

Figure 2:
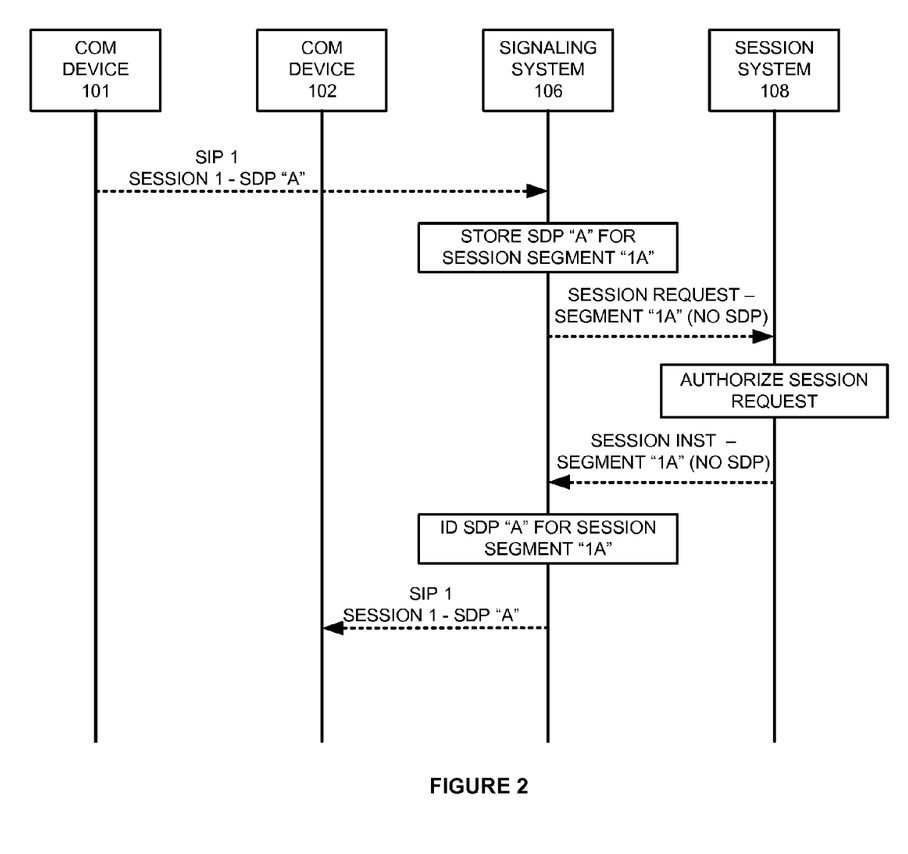

FIG. 2 illustrates the operation of communication system 100 with SIP server 104 to handle SIP messages that include SDP data sets. Communication device 101 transmits a SIP message for Session #1 having SDP data set "A" to signaling data system 106. For example, the SIP message may comprise an INVITE (100) message. Signaling data system 106 stores SDP data set "A" in association with session segment identifier "1A". Signaling data system 106 transfers a session request to session data system 108. The session request has the session segment identifier "1A" but does not contain not SDP data set "A". For example, the session request may comprise an Inter-Processor Communication (IPC) with segment identifier "1A" instead of the entire data set "A".

Session data system 108 authorizes the session request and transfers a session instruction with the session segment identifier "1A" to signaling data system 106. The authorization may entail adding a session segment or call leg to a media server in accord with network rules and user profiles. The additional session segment may be used to couple in a ringback server, voicemail server, video server, and the like to an existing media session. The session instruction may also be an IPC that does not contain SDP data set "A". Signaling data system 106 uses the session segment identifier "1A" to identify SDP data set "A". Signaling data system 106 transfers a SIP message for Session #1 having SDP data set "A" to communication device 102. This SIP message may also be an INVITE (100) message.

Figure 3:
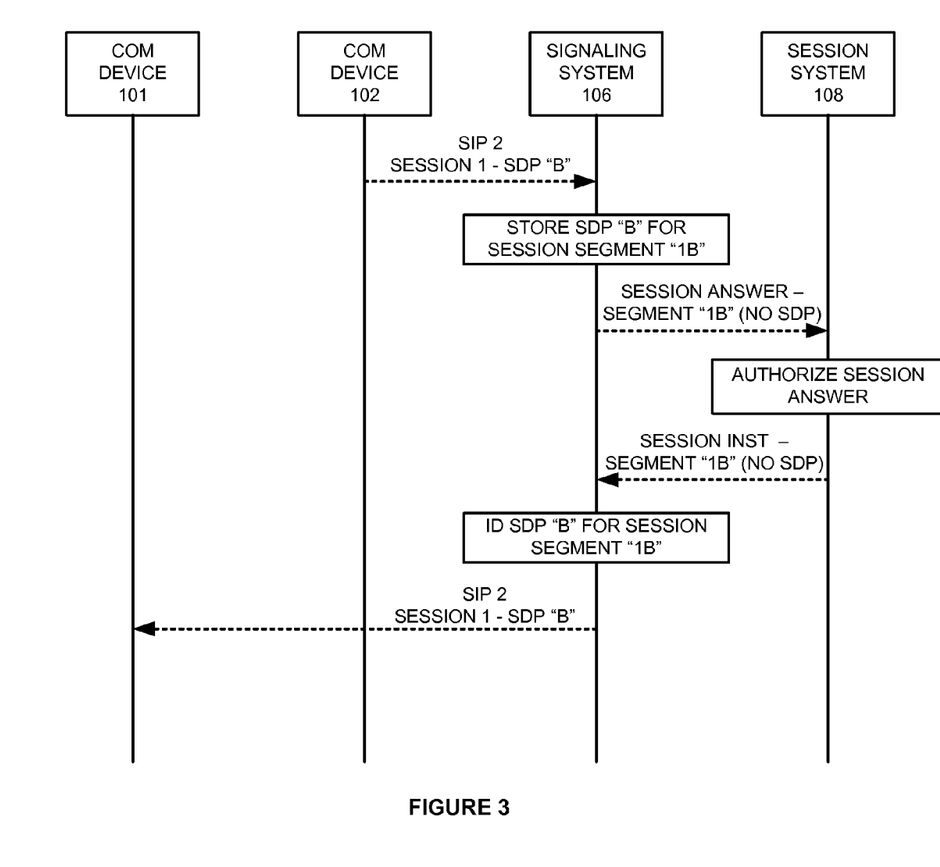

FIG. 3 illustrates the operation of communication system 100 with SIP server 104 to handle SIP messages that include SDP data sets. Communication device 102 transmits a SIP message for Session #1 having SDP data set "B" to signaling data system 106. For example, the SIP message may comprise an OK (200) message. Signaling data system 106 stores SDP data set "B" in association with session segment identifier "1B". Signaling data system 106 transfers a session answer to session data system 108. The session answer has the session segment identifier "1B" but does not contain not SDP data set "B". For example, the session answer may comprise an Inter-Processor Communication (IPC) with segment identifier "1B" instead of the entire data set "B".

Session data system 108 authorizes the session answer and transfers a session instruction with the session segment identifier "1B" to signaling data system 106. The session instruction may also be an IPC that does not contain SDP data set "B". Signaling data system 106 uses the session segment identifier "1B" to identify SDP data set "B". Signaling data system 106 transfers a SIP message for Session #1 having SDP data set "B" to communication device 101. This SIP message may also be an OK (200) message.

Figure 4:
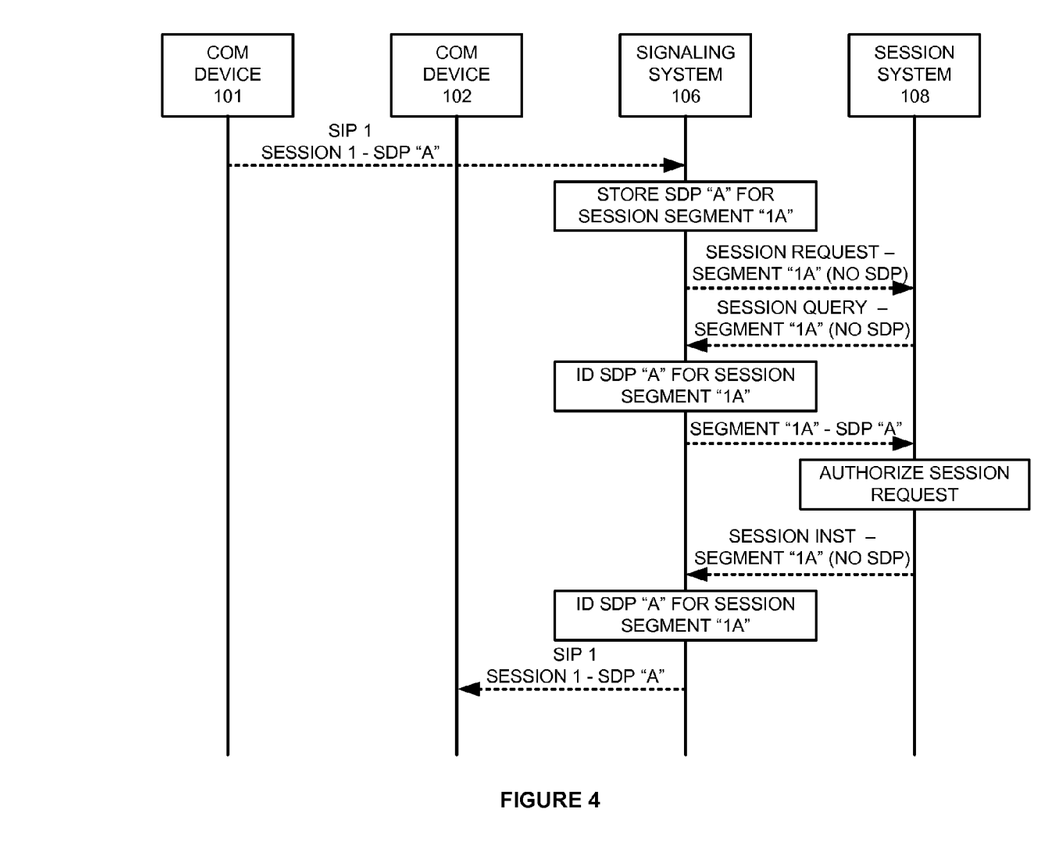
FIG. 4 illustrates SIP server 104 to handle SIP messages with an SDP data query capability.

FIG. 4 illustrates the operation of SIP server 104 to handle SIP messages with an SDP data querying capability. The SDP data querying capability is an optional feature for SIP server 104 that may be varied or omitted. Communication device 101 transmits a SIP message for Session #1 having SDP data set "A" to signaling data system 106. Signaling data system 106 stores SDP data set "A" in association with session segment identifier "1A". Signaling data system 106 transfers a session request to session data system 108. The session request has the session segment identifier "1A" but does not contain not SDP data set "A".

Session data system 108 transfers a session data query for session segment "1A" to signaling data system 106. The session data query may be an IPC that does not contain SDP data set "A". In response to the session query, signaling data system 106 uses session segment identifier "1A" to identify SDP data set "A" and transfers SDP data set "A" to session data system 108. The transfer may be an IPC with SDP data set "A".

Session data system 108 receives and processes SDP data set "A" to authorize the session request. Thus, session data system 108 may retrieve specific SDP data sets upon request from signaling data system 106. Session data system 108 transfers a session instruction with the session segment identifier "1A" to signaling data system 106. The session instruction may also be an IPC that does not contain SDP data set "A". Signaling data system 106 uses the session segment identifier "1A" to identify SDP data set "A". Signaling data system 106 transfers a SIP message for Session #1 having SDP data set "A" to communication device 102.

Figure 5:
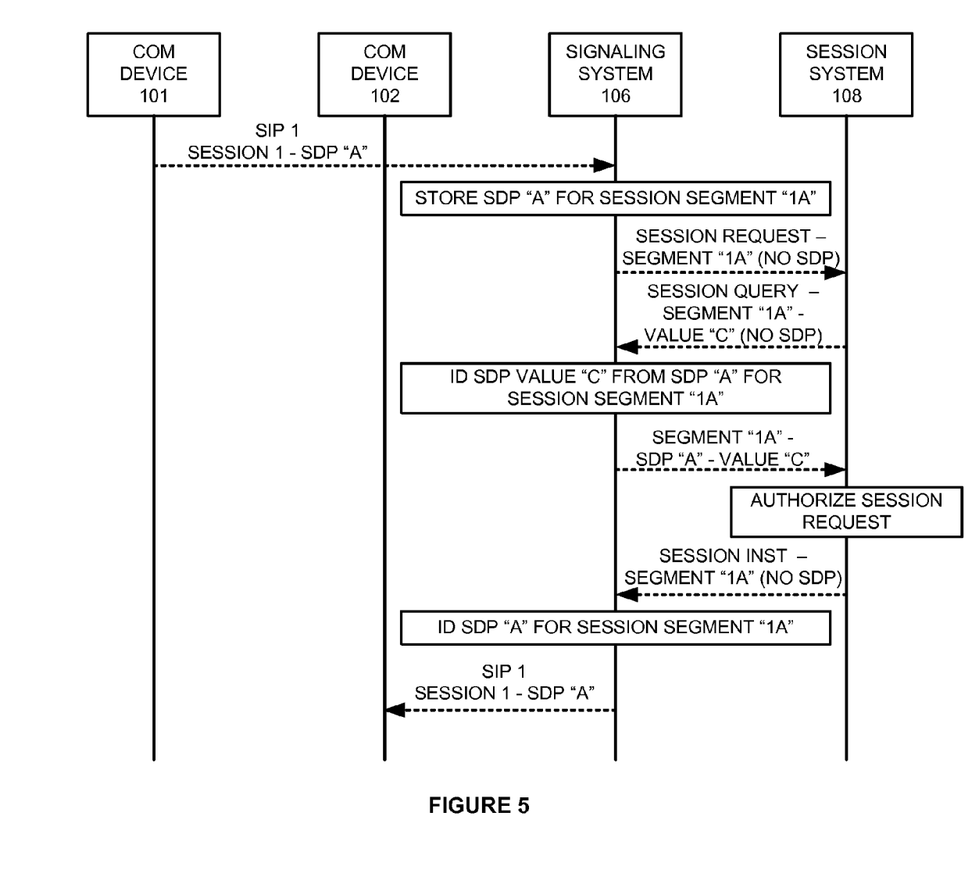
FIG. 5 illustrates SIP server 104 to handle SIP messages with an SDP value query capability.

FIG. 5 illustrates the operation of SIP server 104 to handle SIP messages with an SDP value querying capability. The SDP value querying capability is an optional feature for SIP server 104 that may be varied or omitted. Communication device 101 transmits a SIP message for Session #1 having SDP data set "A" to signaling data system 106. Signaling data system 106 stores SDP data set "A" in association with session segment identifier "1A". Signaling data system 106 transfers a session request to session data system 108. The session request has the session segment identifier "1A" but does not contain not SDP data set "A".

Session data system 108 transfers a session value query for session segment "1A" value "C" to signaling data system 106. The session query may be an IPC that does not contain SDP data set "A". In response to the session value query, signaling data system 106 uses session segment identifier "1A" value "C" to identify SDP value "C" in data set "A". For example, value "C" could be a session identifier, media name, connection information, media address, and/or some other SDP data item. Signaling data system 106 transfers value "C" from SDP data set "A" to session data system 108. The transfer may be an IPC with SDP value "C".

Session data system 108 receives and processes SDP value "C" to authorize the session request. Thus, session data system 108 may retrieve specific SDP data values upon request from signaling data system 106. Session data system 108 transfers a session instruction with the session segment identifier "1A" to signaling data system 106. The session instruction may also be an IPC that does not contain SDP data set "A". Signaling data system 106 uses the session segment identifier "1A" to identify SDP data set "A". Signaling data system 106 transfers a SIP message for Session #1 having SDP data set "A" to communication device 102.

Figure 6:
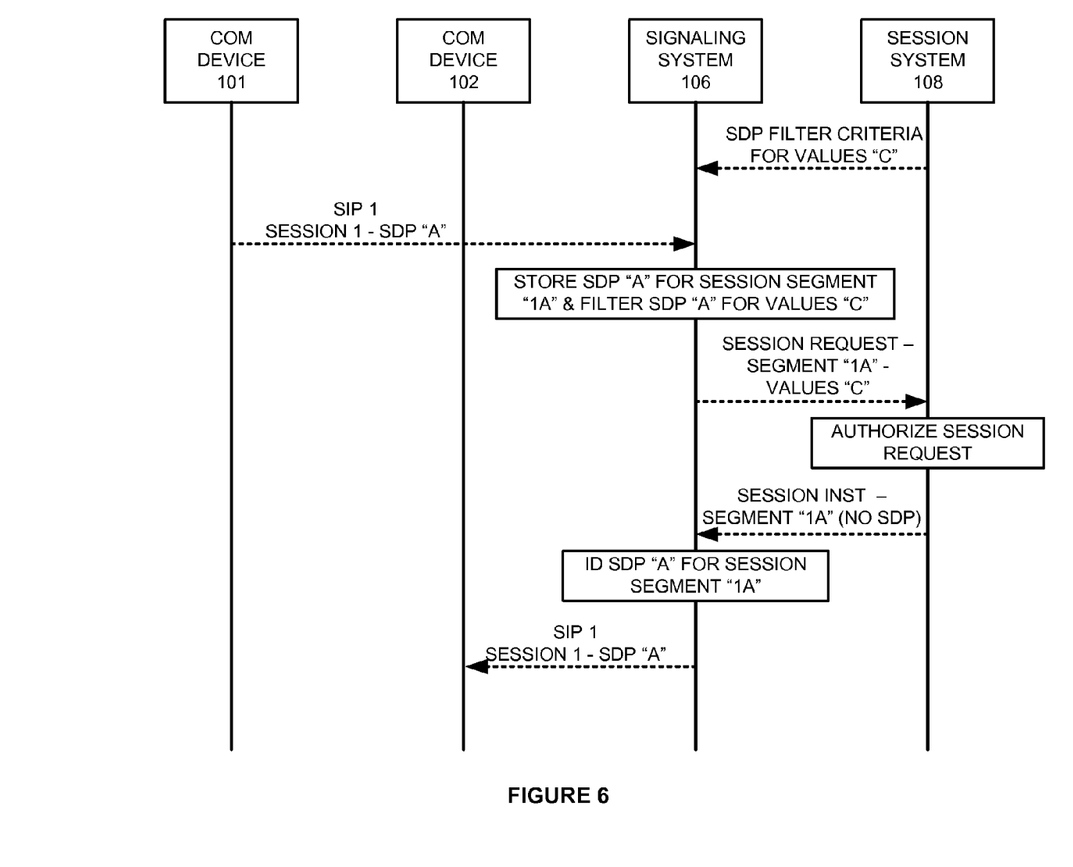
FIG. 6 illustrates SIP server 104 to handle SIP messages with an SDP data filtering capability.

FIG. 6 illustrates the operation of SIP server 104 to handle SIP messages with an SDP data filtering capability. The SDP data filtering capability is an optional feature for SIP server 104 that may be varied or omitted. Session data system 108 transfers filter criteria to signaling data system 106. The filter criteria indicates SDP values to pass and/or block. The filter criteria could be general to all sessions or may vary from session to session. For example, session data system 108, may be use different SDP filter criteria for different IP addresses or address pairs.

Communication device 101 transmits a SIP message for Session #1 having SDP data set "A" to signaling data system 106. Signaling data system 106 stores SDP data set "A" in association with session segment identifier "1A". Signaling data system 106 applies the filter criteria to data set "A" to identify value(s) "C"—possibly in response to IP addresses or other data in the SIP message. Signaling data system 106 transfers a session request to session data system 108. The session request has the session segment identifier "1A" and SDP value(s) "C" but the session request does not contain the entire SDP data set "A". The session request may be an IPC.

Session data system 108 receives and processes SDP value(s) "C" to authorize the session request. Thus, session data system 108 may pre-order specific SDP data values from signaling data system 106 on a per-session basis. Session data system 108 transfers a session instruction with the session segment identifier "1A" to signaling data system 106. The session instruction may also be an IPC that does not contain SDP data set "A". Signaling data system 106 uses the session segment identifier "1A" to identify SDP data set "A". Signaling data system 106 transfers a SIP message for Session #1 having SDP data set "A" to communication device 102.

Figure 7:
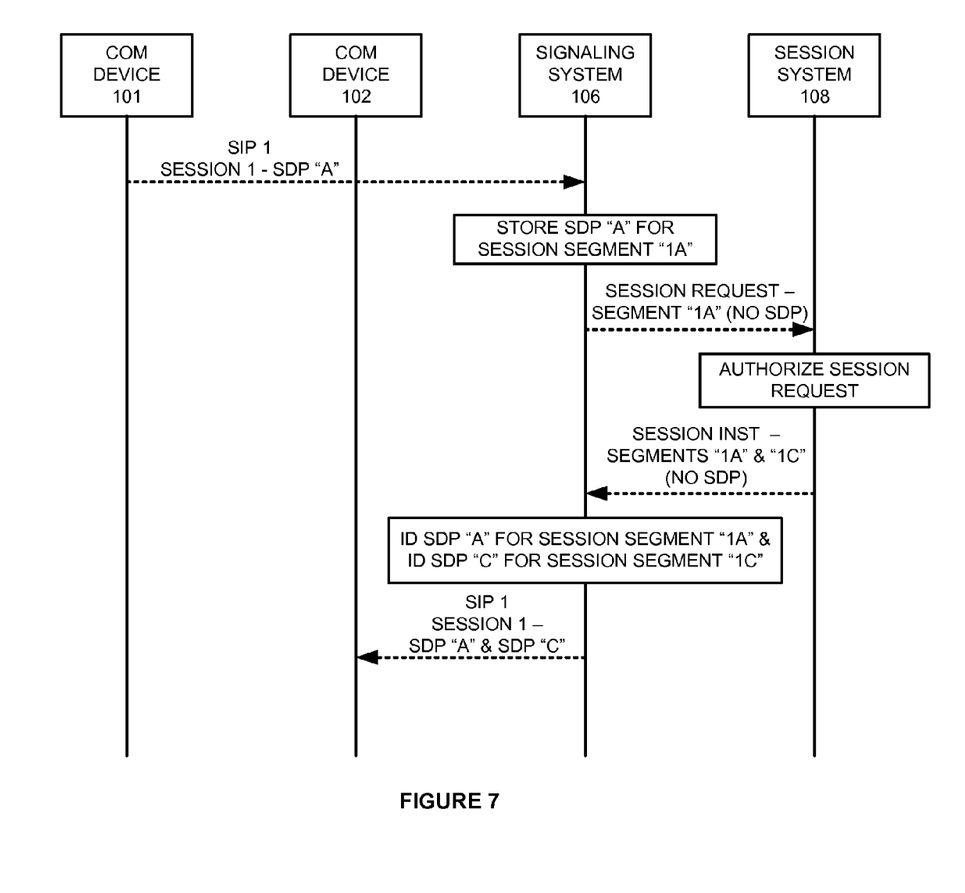
FIG. 7 illustrates SIP server 104 to handle SIP messages with a multi-SDP data set capability.

FIG. 7 illustrates the operation of SIP server 104 to handle SIP messages with multi-SDP data capability. The multi-SDP data capability is an optional feature for SIP server 104 that may be varied or omitted. Communication device 101 transmits a SIP message for Session #1 having SDP data set "A" to signaling data system 106. Signaling data system 106 stores SDP data set "A" in association with session segment identifier "1A". Signaling data system 106 has already stored SDP data set "C" in association with session segment identifier "1C". Signaling data system 106 transfers a session request to session data system 108. The session request has the session segment identifier "1A" but does not contain not SDP data set "A" or "C".

Session data system 108 is already aware of session segment 1C. Session data system 108 receives and authorizes the session request. Session data system 108 transfers a session instruction with the session segment identifiers "1A" and "1C" to signaling data system 106. The session instruction may also be an IPC that does not contain SDP data set "A" or "C". Signaling data system 106 uses the session segment identifier "1A" to identify SDP data set "A". Signaling data system 106 uses the session segment identifier "1C" to identify SDP data set "C". Signaling data system 106 transfers a SIP message for Session #1 having SDP data sets "A" and "C" to communication device 102.

Figure 8:
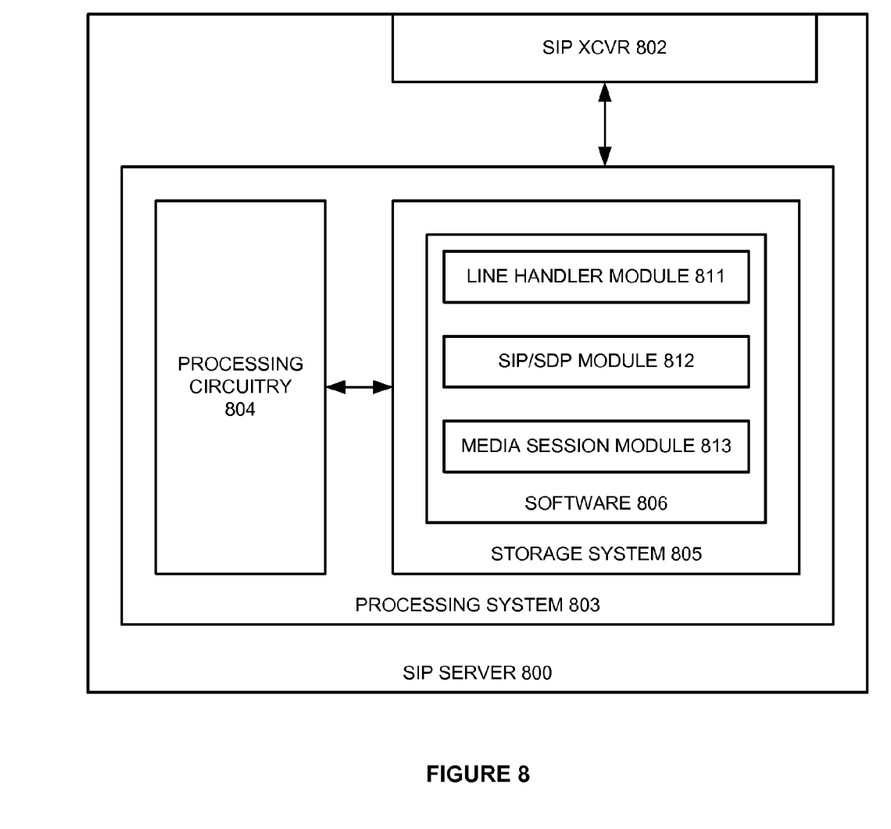
FIG. 8 illustrates SIP server 800 to handle SIP messages that include SDP data sets.

FIG. 8 illustrates SIP server 800 to transfer media sessions between communication networks. SIP server 800 is an example of SIP server 104, although server 104 may use alternative configurations and operations. SIP server 800 comprises SIP transceiver 802 and processing system 803. Processing system 803 comprises processing circuitry 804 and storage system 805. Storage system 805 stores software 806. Software 806 includes software modules 811-813. Some conventional aspects of SIP server 800 are omitted for clarity, such as power supplies, enclosures, and the like. SIP server 800 may be centralized or distributed and may include various virtualized components.

SIP transceiver 802 comprises communication components, such as ports, signal processing circuitry, memory, software, and the like. SIP transceiver 802 exchanges SIP messages with SIP endpoints over IP networks.

In processing system 803, processing circuitry 804 comprises circuit boards, integrated circuitry, and associated electronics. Storage system 805 comprises non-transitory, machine-readable, data storage media, such as flash drives, disc drives, memory circuitry, servers, and the like. Software 806 comprises machine-readable instructions that control the operation of processing circuitry 804 when executed. Software 806 includes modules 811-813 and may also include operating systems, applications, utilities, databases, and the like. All or portions of software 806 may be externally stored on one or more storage media, such as flash drives, discs, servers, and the like.

When executed by processing circuitry 804, line handler module 811 directs circuitry 804 to exchange SIP messages through SIP transceiver 802. When executed by processing circuitry 804, SIP/SDP module 812 directs circuitry 804 to store SDP data sets in association with session segment identifiers and transfer the SIP messages with the session segment identifiers but not the SDP data sets to media session module 813. When executed by processing circuitry 804, media session module 813 directs circuitry 804 to process SIP messages with session segment identifiers instead of SDP data sets. Media session module 813 may include a voice session module, video session module, gaming session module, conferencing module, and the like.

Processing system 803 comprises a multi-threaded system where processing circuitry 804 provides multiple independent processing threads that may be shared among software modules 811-813. Line handler module 811 uses a first one of the processing threads and communicates with SIP/SDP module 812 using IPC. SIP/SDP module 812 uses a second one of the processing threads and communicates with media session module 813 using IPC. Media session module 813 uses a third one of the processing threads and communicates with SIP/SDP module 812 using IPC.

Referring back to FIG. 1, communication devices 101-102 may comprise SIP endpoints with additional networks and systems between devices 101-102 and the end-users of the media sessions. Communication network(s) 103 comprise one or more networks that include Internet Protocol (IP) routers, access nodes, servers, gateways, links, and/or some other network elements—including combinations thereof. Communication devices 101-102 and communication network(s) 103 communicate over respective links 111-112. SIP server 104 and communication network(s) 103 communicate over link(s) 113. Links 111-113 comprise metal, glass, plastic, air, and/or some other communication media—including combinations thereof. Links 111-113 use Ethernet, Time Division Multiplex (TDM), Data Over Cable Service Interface Specification (DOCSYS), Long Term Evolution (LTE), Wireless Fidelity (WiFi), Internet Protocol (IP), User Datagram Protocol (UDP), Transmission Control Protocol (TCP), Session Initiation Protocol (SIP), and/or some other communication format—including combinations thereof. Links 111-113 may include intermediate networks, systems, and devices.

Network interface 105 comprises physical Input/Output (I/O) ports, memory, signal processors, software, and/or some other networking components—including combinations thereof. Signaling data system 106 comprises processing circuitry, memory, software, and/or some other signaling components—including combinations thereof. Processing interface 107 comprises an Inter-Process Communication (IPC) link, SIP interface, and/or some other data transfer apparatus—including combinations thereof. Session data system 108 comprises processing circuitry, memory, software, and/or some other session controllers—including combinations thereof.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a Session Initiation Protocol (SIP) server including a signaling data system and a session data system stored on a storage system and executed by a processing system, the method comprising:
   in the signaling data system, receiving a first SIP message having a Session Description Protocol (SDP) data set, and in response, storing the SDP data set in association with a session segment identifier and transferring a session request having the session segment identifier and not the SDP data set;

in the session data system, receiving the session request having the session segment identifier and not the SDP data set, and in response, authorizing the session request and transferring a session instruction having the session segment identifier; and in the signaling data system, receiving the session instruction having the session segment identifier, and in response, identifying the SDP data set with the session segment identifier and transferring a second SIP message having the SDP data set.

2. The method of claim 1 further comprising:
in the session data system, transferring a session query having the session segment identifier;
in the signaling data system, receiving the session query having the session segment identifier, and in response, transferring the SDP data set; and
in the session data system, receiving and processing the SDP data set to generate the session instruction.

3. The method of claim 1 further comprising:
in the session data system, transferring a session query having the session segment identifier and a segment value identifier;
in the signaling data system, receiving the session query having the session segment identifier and the segment value identifier, and in response, transferring an SDP value from the SDP data set that corresponds to the session segment identifier and the segment value identifier; and
in the session data system, receiving and processing the SDP value from the SDP data set to generate the session instruction.

4. The method of claim 1 wherein:
transferring the session request not having the SDP data set comprises filtering the SDP data set to select SDP values and transferring the session request having the selected SDP values and not the SDP data set; and wherein
receiving the session request comprises receiving the selected SDP values and not the SDP data set.

5. The method of claim 1 further comprising:
in the session data system, transferring SDP filter criteria;
in the signaling data system, receiving the SDP filter criteria; wherein
transferring the session request not having the SDP data set comprises filtering the SDP data set based on the SDP filter criteria set to select SDP values and transferring the session request having the selected SDP values and not the SDP data set; and wherein
receiving the session request comprises receiving the selected SDP values and not the SDP data set.

6. The method of claim 1 wherein:
transferring the session instruction having the session segment identifier further comprises transferring the session instruction having an additional session segment identifier;
receiving the session instruction having the session segment identifier further comprises receiving the session instruction having the additional session segment identifier;
identifying the SDP data set with the session segment identifier further comprises identifying an additional SDP data set with the additional session segment identifier; and
transferring the second SIP message having the SDP data set further comprises transferring the second SIP message having the additional SDP data set.

7. The method of claim 1 wherein:
receiving the first SIP message comprises receiving a first SIP 100 Invite message and transferring the second SIP message comprises transferring a second SIP 100 Invite message; and
transferring the session request comprises transferring an Inter-Process Communication (IPC) and receiving the session instruction comprises receiving another IPC.

8. The method of claim 1 wherein:
receiving the first SIP message comprises receiving a first SIP 200 OK message and transferring the second SIP message comprises transferring a second SIP 200 OK message; and
transferring the session request comprises transferring an Inter-Process Communication (IPC) and receiving the session instruction comprises receiving another IPC.

9. The method of claim 1 wherein:
the signaling data system comprises a multi-threaded processing system having multiple processing threads and configured to execute a SIP software module using a first set of the processing threads; and
the session data system comprises the multi-threaded processing system configured to execute a voice session software module using a second set of the processing threads.

10. The method of claim 1 wherein:
the signaling data system comprises a multi-threaded processing system having multiple processing threads and configured to execute a SIP software module using a first set of the processing threads; and
the session data system comprises the multi-threaded processing system configured to execute a video session software module using a second set of the processing threads.

11. A Session Initiation Protocol (SIP) server comprising:
a signaling data system and a session data system stored on a storage system and executed by a processing system, wherein:
the signaling data system configured to receive a first SIP message having a Session Description Protocol (SDP) data set, and in response, store the SDP data set in association with a session segment identifier and transfer a session request having the session segment identifier and not the SDP data set;
the session data system configured to receive the session request having the session segment identifier and not the SDP data set, and in response, authorize the session request and transfer a session instruction having the session segment identifier;
the signaling data system configured to receive the session instruction having the session segment identifier, and in response, identify the SDP data set with the session segment identifier and transfer a second SIP message having the SDP data set.

12. The SIP server of claim 11 wherein:
the session data system is configured to transfer a session query having the session segment identifier;
the signaling data system is configured to receive the session query having the session segment identifier, and in response, transfer the SDP data set; and
the session data system is configured to receive and process the SDP data set to generate the session instruction.

13. The SIP server of claim 11 wherein:
the session data system is configured to transfer a session query having the session segment identifier and a segment value identifier;

the signaling data system is configured to receive the session query having the session segment identifier and the segment value identifier, and in response, transfer an SDP value from the SDP data set that corresponds to the session segment identifier and the segment value identifier; and the session data system is configured to receive and process the SDP value from the SDP data set to generate the session instruction.

14. The SIP server of claim 11 wherein:

the signaling data system is configured to filter the SDP data set to select SDP values and transfer the session request having the selected SDP values and not the SDP data set; and wherein the session data system is configured to receive the selected SDP values and not the SDP data set.

15. The SIP server of claim 11 wherein:

the session data system is configured to transfer SDP filter criteria;

the signaling data system is configured to receive the SDP filter criteria; wherein the signaling data system is configured to filter the SDP data set based on the SDP filter criteria set to select SDP values and transfer the session request having the selected SDP values and not the SDP data set; and the session data system is configured to receive the selected SDP values and not the SDP data set.

16. The SIP server of claim 11 wherein:

the session data system is configured to transfer the session instruction having an additional session segment identifier;

the signaling data system is configured to receive the additional session segment identifier, identify an additional SDP data set with the additional session segment identifier, and transfer the second SIP message having the additional SDP data set.

17. The SIP server of claim 11 wherein:

the first SIP message comprises a first SIP 100 Invite message;

the second SIP message comprises a second SIP 100 Invite message;

the session request comprises an Inter-Process Communication (IPC); and the session instruction comprises another IPC.

18. The SIP server of claim 11 wherein:

the first SIP message comprises a first SIP 200 OK message;

the second SIP message comprises a second SIP 200 OK message;

the session request comprises an Inter-Process Communication (IPC); and the session instruction comprises another IPC.

19. The SIP server of claim 11 wherein:

the signaling data system comprises a multi-threaded processing system having multiple processing threads and configured to execute a SIP software module using a first set of the processing threads; and the session data system comprises the multi-threaded processing system configured to execute a voice session software module using a second set of the processing threads.

20. The SIP server of claim 11 wherein:

the signaling data system comprises a multi-threaded processing system having multiple processing threads and is configured to execute a SIP software module using a first set of the processing threads; and the session data system comprises the multi-threaded processing system configured to execute a video session software module using a second set of the processing threads.

* * * * *